US008503013B2

United States Patent
Seki et al.

(10) Patent No.: US 8,503,013 B2
(45) Date of Patent: Aug. 6, 2013

(54) IMAGE FORMING APPARATUS

(75) Inventors: Hirotaka Seki, Tokyo (JP); Shigeo Hata, Toride (JP); Atsushi Otani, Moriya (JP); Akihiko Sakai, Abiko (JP); Shoji Takeda, Tokyo (JP); Satoru Yamamoto, Abiko (JP); Keita Takahashi, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 575 days.

(21) Appl. No.: 12/724,690

(22) Filed: Mar. 16, 2010

(65) Prior Publication Data

US 2010/0272454 A1 Oct. 28, 2010

(30) Foreign Application Priority Data

Apr. 23, 2009 (JP) ................................. 2009-105609

(51) Int. Cl.
*G06F 3/12* (2006.01)
*G06K 15/00* (2006.01)

(52) U.S. Cl.
USPC ........................................ 358/1.15; 358/1.13

(58) Field of Classification Search
None
See application file for complete search history.

(56) References Cited

U.S. PATENT DOCUMENTS 6,292,741 B1  9/2001  Bitzer et al.
2007/0260753 A1*  11/2007  Komatsu et al. ................... 710/1

FOREIGN PATENT DOCUMENTS

| JP | 11-146116 A | 5/1999 |
|---|---|---|
| JP | 2000-071819 | 3/2000 |
| JP | 2001-119506 | 4/2001 |
| JP | 2005-148541 A | 6/2005 |
| JP | 2006-171960 | 6/2006 |
| JP | 2008-5015 A | 1/2008 |

OTHER PUBLICATIONS

Office Action mailed Apr. 12, 2013, in Japanese Application No. 2009-105609.

\* cited by examiner

*Primary Examiner* — Dov Popovici
(74) *Attorney, Agent, or Firm* — Fitzpatrick, Cella, Harper & Scinto

(57) ABSTRACT

There is provided an image forming apparatus which adopts a distributed control system and suppresses generation of radiation noise without increasing the cost. To accomplish this, the image forming apparatus includes a master control unit that controls the overall image forming apparatus, a plurality of sub-master control units that control a plurality of functions for performing image formation, and a plurality of salve control units that control loads for implementing a plurality of functions. The image forming apparatus performs distributed control. The image forming apparatus determines the operating frequencies of the salve control units in accordance with loads controlled by the salve control units. The image forming apparatus compares the operating frequencies of the slave control units. Based on the comparison result, the image forming apparatus changes the operating frequency of a slave control unit that is equal to the operating frequency of another slave control unit.

7 Claims, 14 Drawing Sheets

IMAGE FORMING APPARATUS

BACKGROUND OF THE INVENTION

1. Field of the Invention

The present invention relates to an image forming apparatus implemented by a distributed control system including a plurality of CPU groups having a hierarchical structure.

2. Description of the Related Art

Centralized control using one CPU is performed for printer device control of an image forming apparatus using an electrophotographic system. An increasing CPU load due to centralized control requires a higher performance CPU. In addition, as the load of the printer device rises, communication cables (a bundle of communication lines) need to be laid from a CPU board to distant load driver units and many long communication cables are indispensable. To solve these problems, a control form is receiving a great deal of attention, in which control modules that build an electrophotographic system are assigned to sub-CPUs.

Examples of the construction of a control system by distributing respective partial module control functions to a plurality of CPUs have been proposed in several control equipment product fields other than copying machines. For example, Japanese Patent Laid-Open No. 2000-071819 has proposed a technique of hierarchically locating functional modules in a vehicle and performing distributed control. Japanese Patent Laid-Open No. 2006-171960 has proposed a technique of applying a similar hierarchical control structure to robot/automation equipment. These sub-CPUs require a communication unit to operate them as a system as a whole. According to Japanese Patent Laid-Open No. 2006-171960, separate communication networks are constructed for respective hierarchical layers in a control network for performing communication between functional modules. By distributing loads, a more stable control network can be built.

However, these conventional techniques suffer the following problems. When this system configuration is applied to distributed control of an image forming apparatus, a plurality of CPUs operate at the same operating frequency. The peak value of the frequency spectrum of a clock signal rises, increasing radiation noise. The radiation noise may be suppressed by designing different operating frequencies for respective CPUs. However, the operating frequency needs to be determined for each image forming apparatus model. This leads to a larger number of design steps and higher design cost. Further, factory management of CPUs having different operating frequencies is essential and boosts the manufacturing cost.

SUMMARY OF THE INVENTION

The present invention enables realization of an image forming apparatus that adopts a distributed control system and suppresses generation of radiation noise without increasing the cost.

One aspect of the present invention provides an image forming apparatus comprising: an upper layer control unit that controls the image forming apparatus which forms an image on a printing material; a plurality of lower layer control units that are controlled by the upper layer control unit and control loads for performing image formation; and a change unit that changes an operating frequency of a second lower layer control unit that is equal to an operating frequency of a first lower layer control unit among the plurality of lower layer control units.

Another aspect of the present invention provides an image forming apparatus comprising: an upper layer control unit that controls the image forming apparatus which forms an image on a printing material; a plurality of lower layer control units that are controlled by the upper layer control unit and control loads for performing image formation, the plurality of lower layer control units including a first lower layer control unit and a second lower layer control unit; and a change unit that changes an operating frequency of the second lower layer control unit in a case where an operating frequency of the second lower layer control unit is equal to an operating frequency of a first lower layer control unit.

Further features of the present invention will be apparent from the following description of exemplary embodiments with reference to the attached drawings.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

<Arrangement of Image Forming Apparatus>

Figure 1:
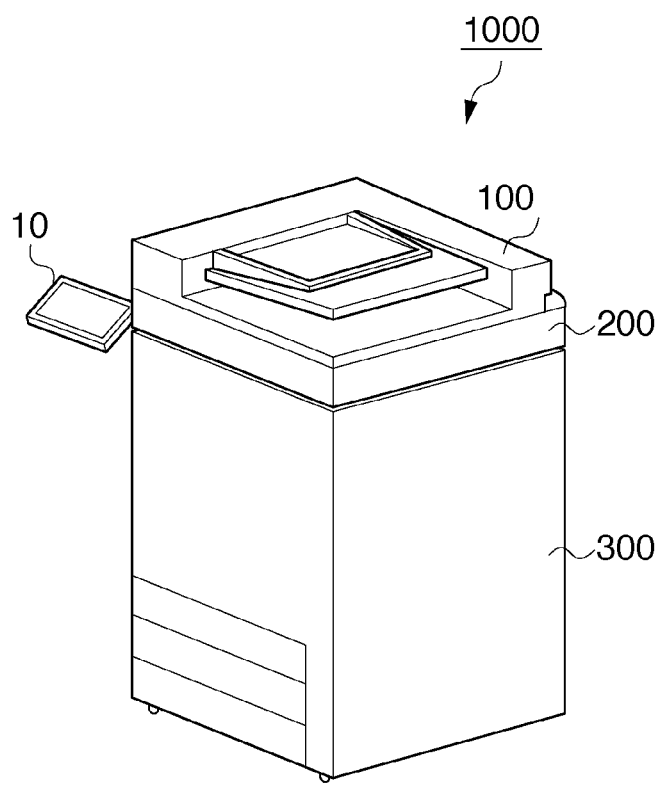
FIG. 1 is a perspective view showing an overview of an image forming apparatus 1000 according to an embodiment.

An embodiment will be described below with reference to FIGS. 1 to 14. FIG. 1 shows an overview of an image forming apparatus 1000 according to the embodiment. The image forming apparatus 1000 includes an automatic document feeder (DF) 100, image reading unit 200, image forming unit 300, and operation unit 10. As shown in FIG. 1, the image reading unit 200 is mounted on the image forming unit 300. The automatic document feeder 100 is mounted on the image reading unit 200. The image forming apparatus 1000 implements distributed control using a plurality of control units (CPUs). The arrangement of each CPU will be described later with reference to FIG. 3.

The automatic document feeder 100 automatically conveys a document onto a document glass. The image reading unit 200 outputs image data by reading the document conveyed from the automatic document feeder 100. The image forming unit 300 forms an image on a printing material (printing sheet) based on image data output from the automatic document feeder 100 or image data input from an external apparatus connected via a network. The operation unit 10 includes a GUI (Graphical User Interface) that allows the user to perform various kinds of operations. The operation unit 10 includes a display unit such as a touch panel and can present information to the user.

<Image Forming Unit>

The image forming unit 300 will be described in detail with reference to FIG. 2. The image forming unit 300 according to the embodiment employs an electrophotographic system. Note that letters Y, M, C, and K as the suffixes of reference numerals in FIG. 2 indicate respective engines corresponding to yellow, magenta, cyan, and black toners. In the following description, an engine corresponding to all types of toner will be denoted by a reference numeral without any of the letters Y, M, C, and K as suffixes. Individual engines will be denoted by reference numerals with the letters Y, M, C, and K as suffixes.

A photosensitive drum (to be simply referred to as a "photosensitive member") 225 serving as an image carrier for forming a full-color electrostatic image is provided to be rotated by a motor in the direction indicated by arrow A. The photosensitive member 225 is surrounded by a primary charger 221, exposure unit 218, developing unit 223, transfer unit 220, cleaner unit 222, and charge remover 271.

A developing unit 223K is used for monochromatic development, and develops a latent image on a photosensitive member 225K with K toner. Developing units 223Y, 223M, and 223C are used for full-color development, and develop latent images on photosensitive members 225Y, 225M, and 225C with Y, M, and C toners, respectively. The transfer unit 220 transfers toner images developed in the respective colors on the photosensitive members 225 at once onto a transfer belt 226 serving as an intermediate transfer member. As a result, the toner images of the four colors are superimposed.

The transfer belt 226 is spanned around rollers 227, 228, and 229. The roller 227 functions as a driving roller that is coupled to a driving source to drive the transfer belt 226. The roller 228 functions as a tension roller to adjust the tension of the transfer belt 226. The roller 229 functions as a backup roller of a transfer roller serving as a secondary transfer unit 231. A transfer roller drive unit 250 is a driving unit for bringing the secondary transfer unit 231 into contact with or apart from the transfer belt 226. A cleaner blade 232 is arranged below the transfer belt 226 after the position where the belt passes through the secondary transfer unit 231. The blade scrapes off residual toner from the transfer belt 226.

A registration roller pair 255, a feed roller pair 235, and vertical path roller pairs 236 and 237 feed printing materials (printing sheets) stored in paper cassettes 240 and 241 and a manual paper feed unit 253 to a nip portion which is a contact portion between the secondary transfer unit 231 and the transfer belt 226. At this time, the transfer roller drive unit 250 brings the secondary transfer unit 231 into contact with the transfer belt 226. A toner image formed on the transfer belt 226 is transferred onto a printing material at the nip portion. Thereafter, a fixing unit 234 thermally fixes the toner image transferred on the printing material. The printing material is then delivered outside the apparatus.

The paper cassettes 240 and 241 and the manual paper feed unit 253 respectively include sheet absence sensors 243, 244, and 245 each for detecting the presence/absence of a printing material. Also, the paper cassettes 240 and 241 and the manual paper feed unit 253 respectively include feed sensors 247, 248, and 249 each for detecting a printing material pickup failure.

An image forming operation by the image forming unit 300 will be described below. After the start of image formation, pickup rollers 238, 239, and 254 convey printing materials stored in the paper cassettes 240 and 241 and the manual paper feed unit 253 one by one to the feed roller pair 235. When the feed roller pair 235 conveys the printing material to the registration roller pair 255, a registration sensor 256 located immediately before the registration roller pair 255 detects the passage of the printing material.

When the registration sensor 256 detects the passage of the printing material, the apparatus according to the embodiment temporarily interrupts the conveying operation after the lapse of a predetermined period of time. As a consequence, the printing material comes into contact with the registration roller pair 255 at rest, and the conveying operation stops. At this time, the convey position is so fixed as to make the leading end of the printing material perpendicular to the conveying path, thereby correcting a skew of the printing material, i.e., the state in which the conveying direction of the printing material shifts from the conveying path. This process will be called position correction. The position correction is required to minimize any subsequent inclination of the image forming direction relative to the printing material. After the position correction, the registration roller pair 255 is activated to supply the printing material to the secondary transfer unit 231. The registration roller pair 255 is coupled to a driving source and driven to rotate upon receiving a driving force via a clutch.

The surface of the photosensitive member 225 is then negatively charged uniformly to a predetermined charge potential by applying a voltage to the primary charger 221. The exposure unit 218 including a laser scanner unit exposes an image portion on the charged photosensitive member 225 to set the image portion at a predetermined exposure potential, thereby forming a latent image. The exposure unit 218 forms a latent image corresponding to an image by turning on and off laser light based on image data sent from a controller 460 via a printer control I/F 215.

A developing bias set in advance for each color is applied to the developing roller of the developing unit 223. The latent image is developed with toner and visualized as a toner image when passing through the developing roller position. The transfer unit 220 transfers the toner image onto the transfer belt 226. The secondary transfer unit 231 then transfers the image onto the printing material conveyed by the feed unit. The printing material passes through a post-registration conveying path 268, and is conveyed to the fixing unit 234 via a fixing convey belt 230.

In the fixing unit 234, first of all, pre-fixing chargers 251 and 252 charge the printing material to prevent image disturbance by compensating for the attraction power of toner, and fixing rollers 233 thermally fix the toner image. After that, a delivery flapper 257 switches the conveying path to a delivery path 258, and delivery rollers 270 deliver the printing material onto a delivery tray 242.

The cleaner unit 222 removes and recovers residual toner from the photosensitive member 225. Finally, the charge remover 271 uniformly removes charges from the photosensitive member 225 to near 0 V in preparation for the next image formation cycle.

The color image formation start timing of the image forming apparatus 1000 allows to form an image at an arbitrary position on the transfer belt 226 because of simultaneous transfer of Y, M, C, and K toner images. However, it is necessary to determine the image formation start timing while shifting the timing to cancel misregistration of the transfer positions of toner images on the photosensitive members 225Y, 225M, and 225C.

In the image forming unit 300, printing materials can be successively fed from the paper cassettes 240 and 241 and the manual paper feed unit 253. In this case, printing materials are fed from the paper cassettes 240 and 241 and the manual paper feed unit 253 at the shortest intervals by taking account of the sheet length of a preceding printing material so that printing materials do not overlap each other. As described above, the registration roller pair 255 is activated after position correction and supplies a printing material to the secondary transfer unit 231. When the printing material reaches the secondary transfer unit 231, the registration roller pair 255 is temporarily stopped again in order to correct the position of a succeeding printing material in the same manner as the preceding printing material.

An operation to form an image on the reverse surface of a printing material will be described in detail. When forming an image on the reverse surface of a printing material, an image is first formed on the obverse surface of the printing material. When an image is formed on only the obverse surface, the fixing unit 234 thermally fixes the toner image, and then the printing material is directly delivered to the delivery tray 242. When an image is to be formed on the reverse surface successively, the delivery flapper 257 switches the conveying path to a reverse surface path 259 upon detecting the printing material by a sensor 269. In synchronism with this, reverse rollers 260 are driven to rotate and convey the printing material to an obverse/reverse surface inversion path 261. After the printing material passes through the obverse/reverse surface inversion path 261 by a distance corresponding to the width in the feed direction, the reverse rollers 260 are driven to rotate reversely and switch the traveling direction of the printing material. With the image-bearing obverse surface facing down, obverse/reverse surface path convey rollers 262 are driven to convey the printing material to an obverse/reverse surface path 263.

The printing material is conveyed to re-feed rollers 264 along the obverse/reverse surface path 263, and a re-feed sensor 265 located immediately before the re-feed rollers 264 detects the passage of the printing material. When the re-feed sensor 265 detects the passage of the printing material, the apparatus according to the embodiment temporarily interrupts the conveying operation after the lapse of a predetermined period of time. Consequently, the printing material comes into contact with the re-feed rollers 264 at rest, and the conveying operation temporarily stops. At this time, the position of the printing material is so fixed as to make the leading end of the printing material perpendicular to the conveying path, thereby correcting a skew of the printing material, i.e., the state in which the conveying direction of the printing material shifts from the conveying path in the re-feed path. This process will be called position recorrection.

The position recorrection is necessary to minimize any subsequent inclination of the image forming direction relative to the reverse surface of the printing material. After the position recorrection, the re-feed rollers 264 are activated to convey the printing material along a feed path 266 with the obverse and reverse surfaces being inverted. A subsequent image forming operation is the same as the above-described one for the obverse surface, so a description thereof will not be repeated. The delivery flapper 257 switches the conveying path to the delivery path 258. Then, the printing material bearing images on its obverse and reverse surfaces is delivered to the delivery tray 242.

Note that the image forming unit 300 can successively feed printing materials in the two-sided printing mode as well. However, this apparatus includes only one system for forming an image on a printing material, fixing a formed toner image, and the like. It is therefore impossible to simultaneously print on the obverse and reverse surfaces. In the two-sided printing mode, the image forming unit 300 alternately forms images on printing materials fed from the paper cassettes 240 and 241 and the manual paper feed unit 253 and printing materials which are inverted for reverse-surface printing and re-fed to the image forming unit.

Figure 2:
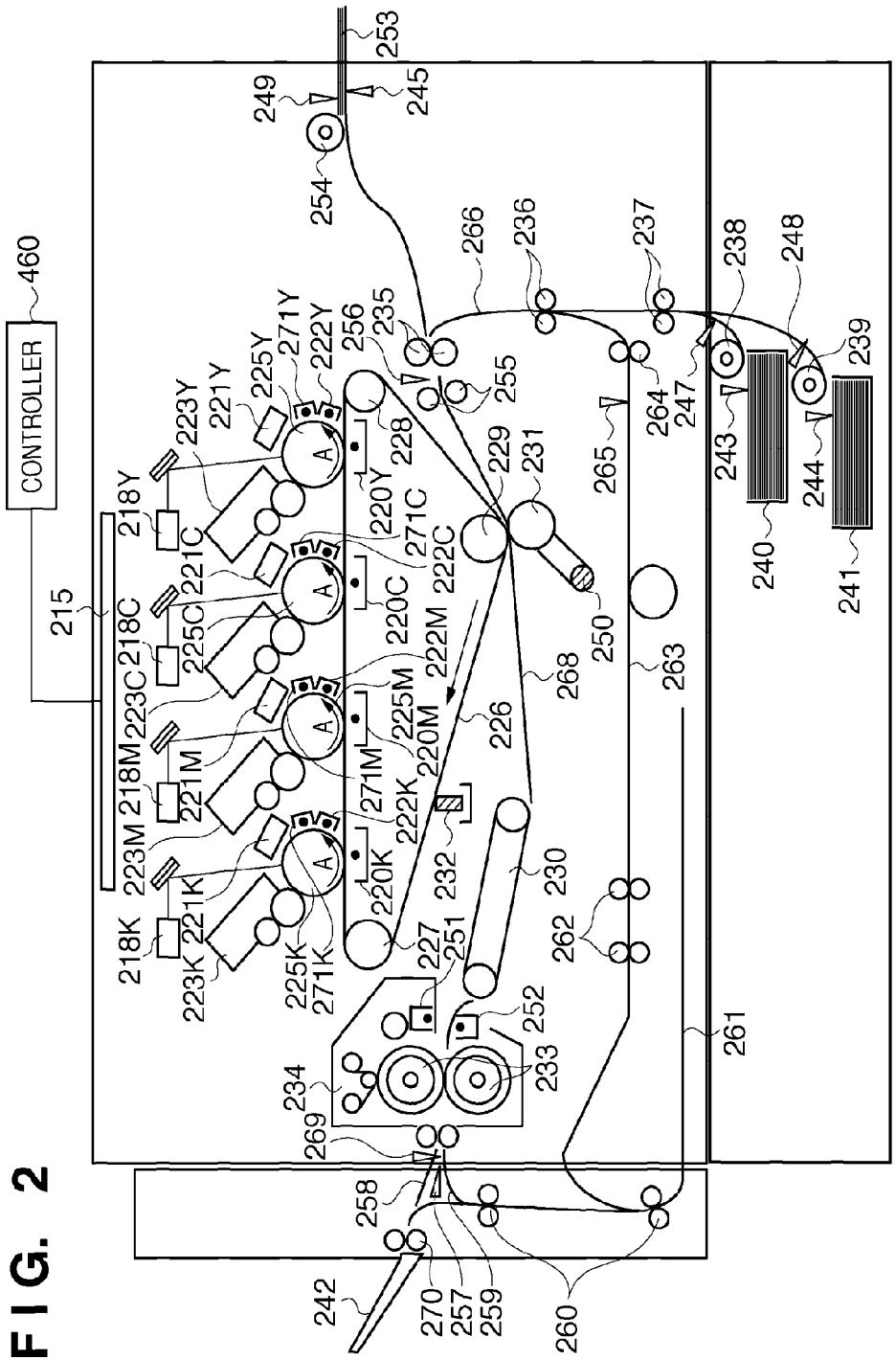
FIG. 2 is a sectional view showing an example of the arrangement of an image forming unit 300 according to the embodiment.

In the image forming unit 300, the loads shown in FIG. 2 are grouped into four control blocks to be described later, namely a convey module A 280, convey module B 281, image forming module 282, and fixing module 283, each of which is autonomously controlled. The image forming unit 300 also includes a master module 284 for comprehensively controlling the four control blocks to make them function as an image forming apparatus. The control arrangement of each module will be explained with reference to FIG. 3.

In the embodiment, a master CPU (master control unit/upper layer control unit) 1001 provided in the master module 284 controls the overall image forming apparatus 1000 based on instructions and image data sent from the controller 460 via the printer control I/F 215. The convey module A 280, convey module B 281, image forming module 282, and fixing module 283 for performing image formation respectively include sub-master CPUs (sub-master control units/lower layer control units) 601, 901, 701, and 801 for controlling the respective functions. The master CPU 1001 controls the sub-master CPUs 601, 901, 701, and 801. The respective functional modules include slave CPUs (slave control units/lower layer control units) 602, 603, 604, 605, 902, 903, 702, 703, 704, 705, 706, 802, and 803 for operating the loads to perform the respective functions. The sub-master CPU 601 controls the slave CPUs 602, 603, 604, and 605. The sub-master CPU 901 controls the slave CPUs 902 and 903. The sub-master CPU 701 controls the slave CPUs 702, 703, 704, 705, and 706. The sub-master CPU 801 controls the slave CPUs 802 and 803.

Figure 3:
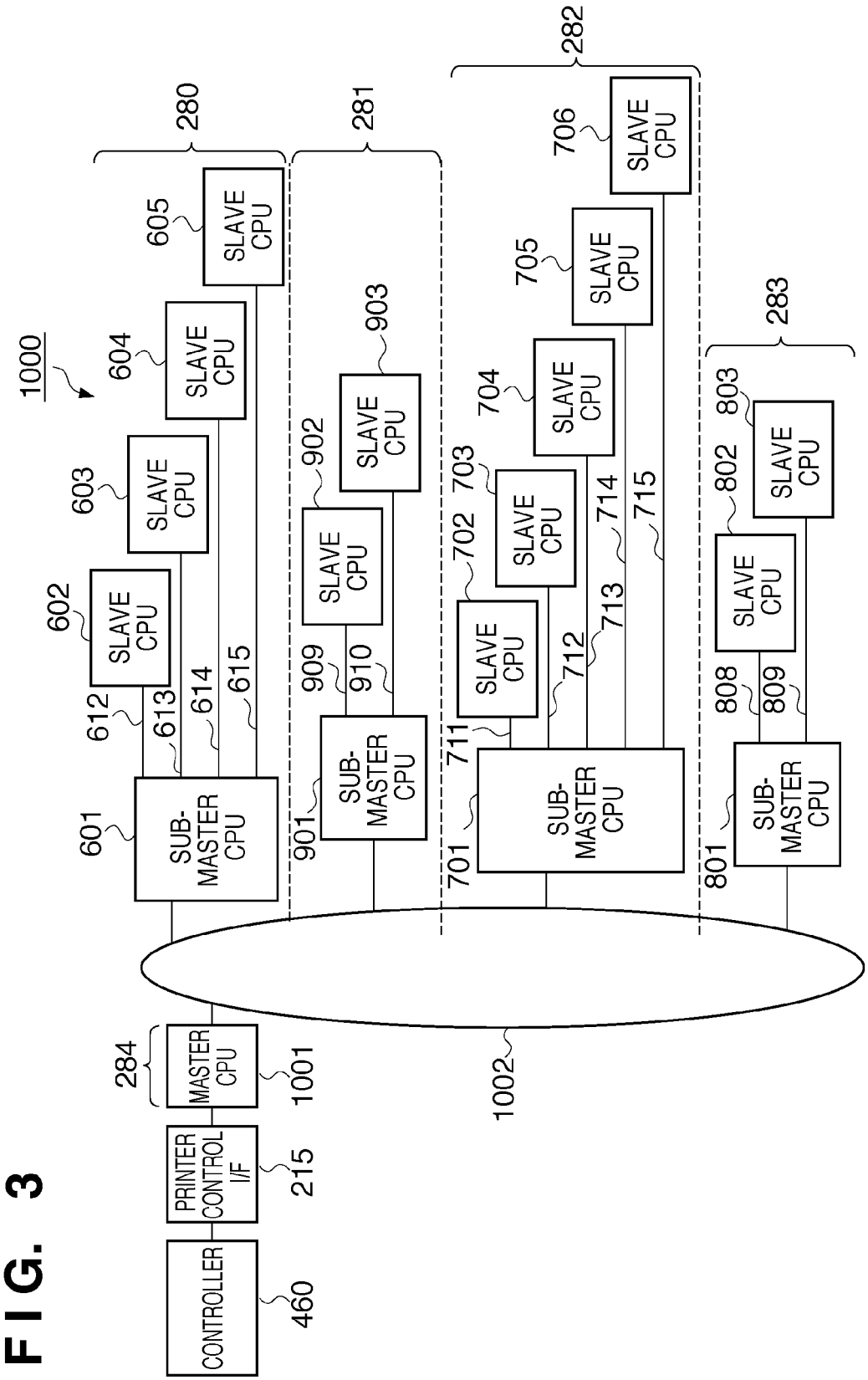
FIG. 3 is a block diagram schematically showing the connection between a master CPU, sub-master CPUs, and slave CPUs according to the embodiment.

As shown in FIG. 3, the master CPU 1001 and the sub-master CPUs 601, 701, 801, and 901 are connected to each other via a common network communication bus (first signal line) 1002. The sub-master CPUs 601, 701, 801, and 901 are also connected to each other via the network communication bus (first signal line) 1002. Note that the master CPU 1001 and the sub-master CPUs 601, 701, 801, and 901 may be ring-connected to each other. The sub-master CPU 601 is further connected one-to-one (peer-to-peer connection) to the slave CPUs 602, 603, 604, and 605 via high-speed serial communication buses (second signal lines) 612, 613, 614, and 615. Likewise, the sub-master CPU 701 is connected to the slave CPUs 702, 703, 704, 705, and 706 via high-speed serial communication buses (second signal lines) 711, 712, 713, 714, and 715. The sub-master CPU 801 is connected to the slave CPUs 802 and 803 via high-speed serial communication buses (second signal lines) 808 and 809. The sub-master CPU 901 is connected to the slave CPUs 902 and 903 via high-speed serial communication buses (second signal lines) 909 and 910. In this case, the high-speed serial communication bus is used for short-distance, high-speed communication.

In the image forming apparatus 1000 according to the embodiment, functions are divided to implement control requiring timing-dependent responsiveness within functional modules comprehensively controlled by the respective sub-master CPUs. Thus, high-speed serial communication buses with good responsiveness are used for communication between the slave CPUs for driving end loads and the sub-master CPUs. In other words, signal lines higher in data transfer timing accuracy than the first signal lines are used as the second signal lines.

On the other hand, only the rough process sequence of the image forming operation requiring no precise control timing is executed between the sub-master CPUs 601, 701, 801, and 901 and the master CPU 1001. For example, the master CPU 1001 instructs the sub-master CPUs to start a pre-image formation process, pre-feed process, and post-image formation process. Before the start of image formation, the master CPU 1001 issues instructions to the sub-master CPUs, based on modes (e.g., monochrome mode and two-sided image formation mode) designated by the controller 460. Also, only operations requiring no precise timing control is performed between the sub-master CPUs 601, 701, 801, and 901. That is, the control of the image forming apparatus is divided into control units that do not mutually require precise timing control. The respective sub-master CPUs control the respective control units at precise timings. The image forming apparatus 1000, therefore, minimizes the communication traffic and enables connection using the inexpensive, low-speed network communication bus 1002. Note that the master CPU, sub-master CPUs, and slave CPUs need not always be mounted on uniform control boards, and can be variably located in accordance with situations concerning apparatus implementation.

Figure 4:
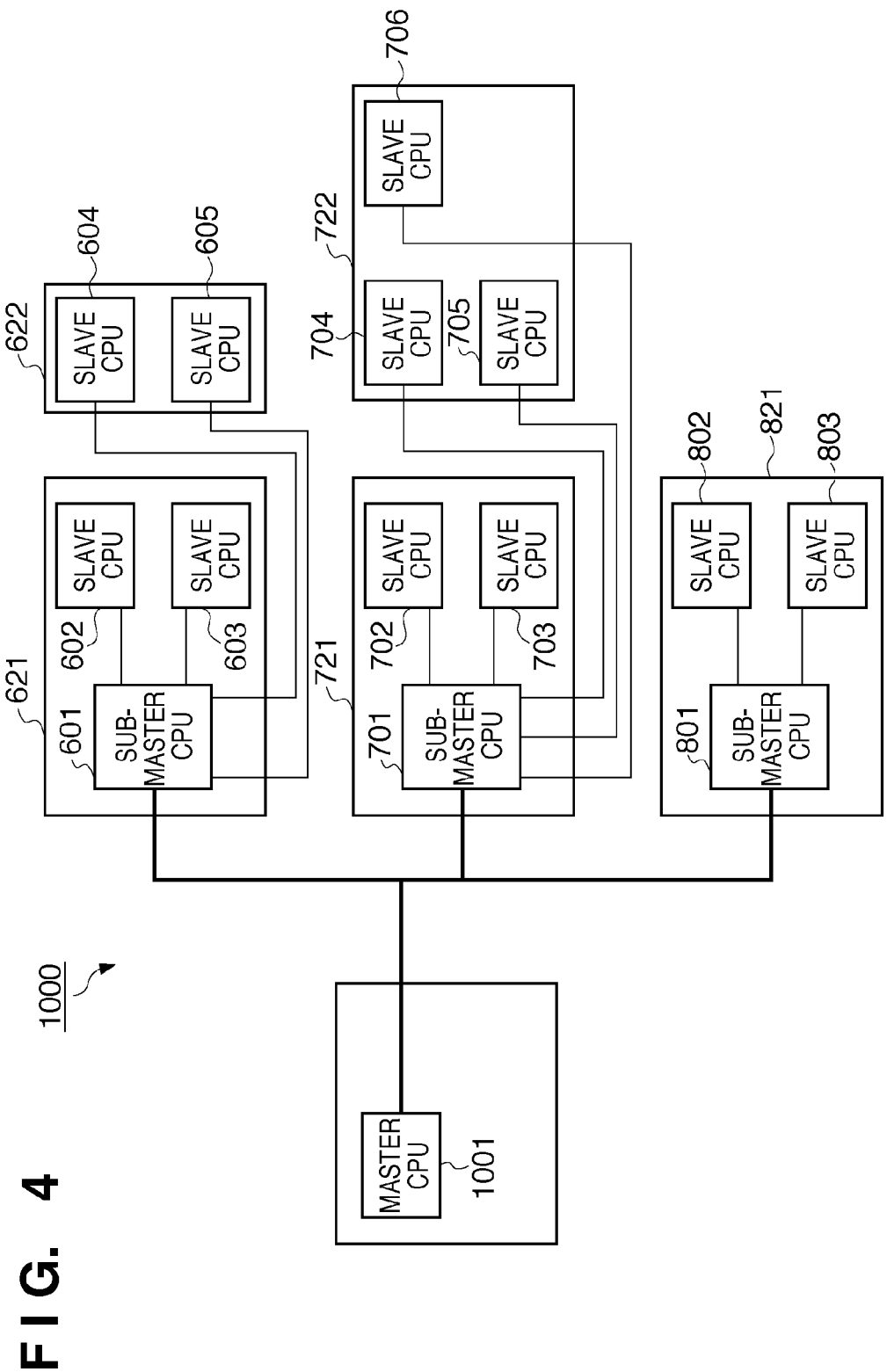
FIG. 4 is a view showing an example of the control boards of the image forming apparatus 1000 according to the embodiment.
Figure 9:
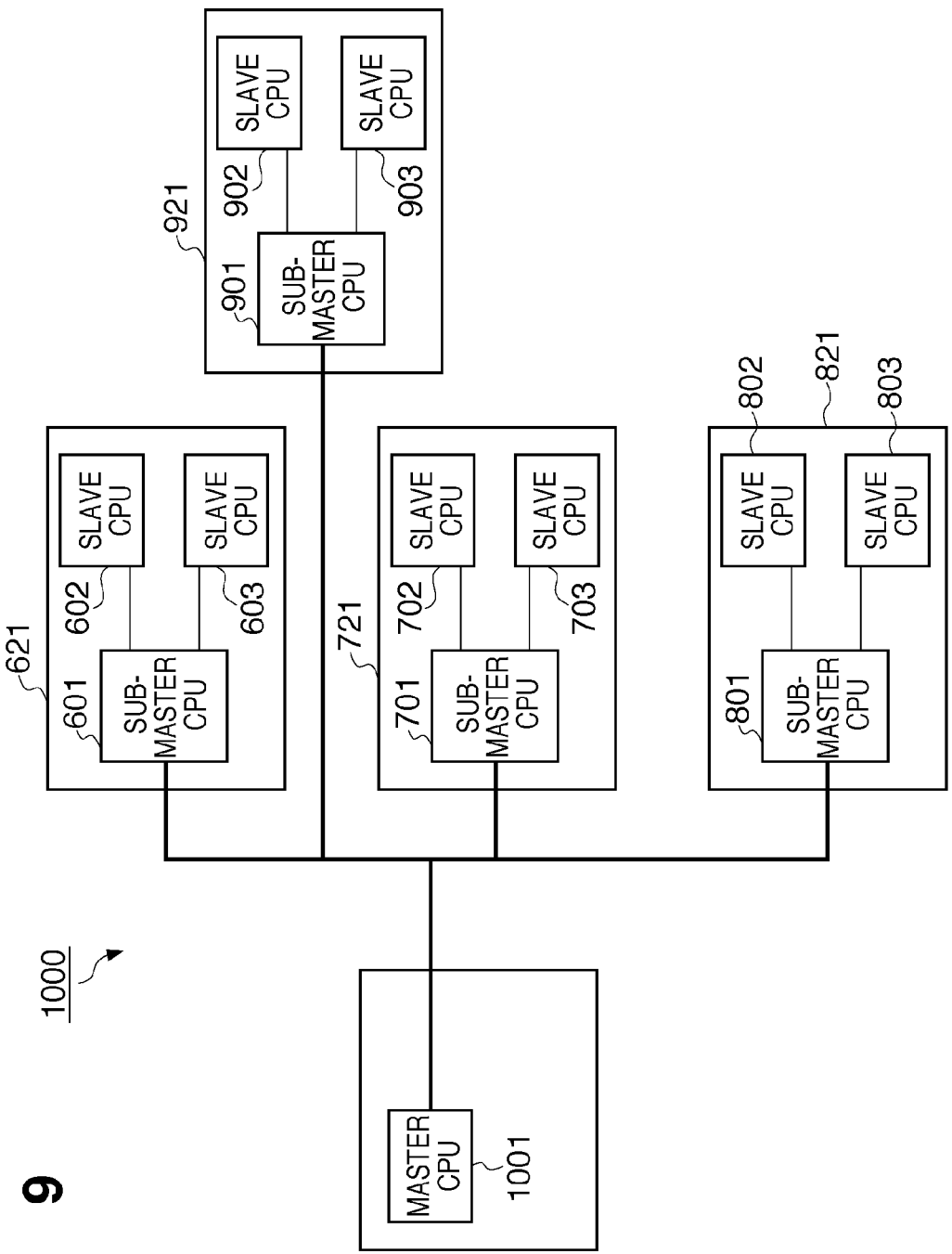
FIG. 9 is a view showing an example of the control boards of the image forming apparatus 1000 according to the embodiment.

The specific locations of the master CPU, sub-master CPUs, and slave CPUs on boards in the embodiment will be described with reference to FIGS. 4 and 9. The embodiment can employ various control board arrangements, as shown in FIGS. 4 and 9. For example, the sub-master CPU 601 and the slave CPUs 602 and 603 are mounted on a single board. In the arrangement shown in FIG. 4, all circuit boards 621, 721, and 821 of the sub-master CPUs and slave CPUs are formed from identical circuits, and only programs installed to control the sub-master CPUs and slave CPUs are different. If the single circuit board 621 cannot satisfy the performance, a circuit board 622 including the slave CPUs 604 and 605 may be added. If the single circuit board 721 cannot satisfy the performance, a circuit board 722 including the slave CPUs 704, 705, and 706 may be added. In this way, desired product specifications can be provided.

A modification to the arrangement of FIG. 4 will be explained with reference to FIG. 9. As shown in FIG. 9, all circuit boards 621, 721, 821, and 921 of the sub-master CPUs and slave CPUs are formed from identical circuits, and only programs installed to control the sub-master CPUs and slave CPUs are different. The circuit boards 621, 721, and 821 are identical as those in the arrangement shown in FIG. 4. In FIG. 9, the circuit board 921 is added to meet the performance. More specifically, in FIG. 4, a circuit board including only slave CPUs is added to satisfy the performance. To the contrary, in FIG. 9, a circuit board including a sub-master CPU and slave CPUs is added. Product specifications required can be easily provided by changing the number of identical mounted circuit boards including sub-master CPUs and slave CPUs, and changing programs installed to control sub-master CPUs and slave CPUs. The program for controlling sub-master CPUs and slave CPUs suffices to be installed appropriately for the loads of the sub-master CPUs and slave CPUs.

<Arrangement of Each Control Module>

Figure 5:
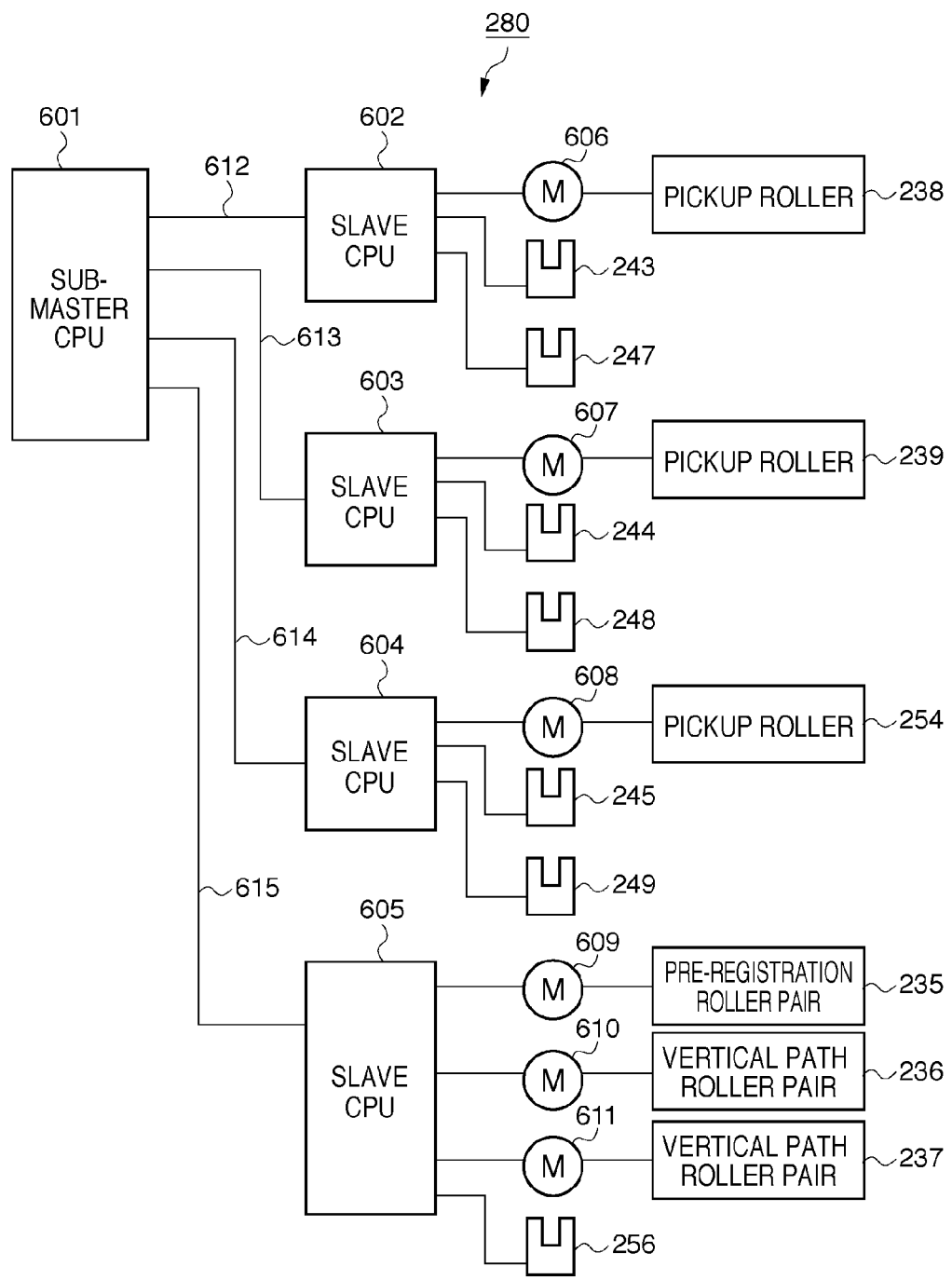
FIG. 5 is a view showing an example of the arrangement of a convey module A 280 according to the embodiment.

The function and arrangement of each control module will be described in detail with reference to FIGS. 5 to 8. FIG. 5 shows an example of the arrangement of the convey module A 280 according to the embodiment. The convey module A 280 takes charge of feed control (feed function) until each of printing materials stored in the cassettes 240 and 241 and the manual paper feed unit 253 comes into contact with the nip portion of the registration roller pair 255 at rest. The convey module A 280 includes the sub-master CPU 601 to comprehensively control feed control and the slave CPUs 602, 603, 604, and 605 to drive control loads. Each slave CPU is connected to control loads directly controlled by it.

The slave CPU 602 has, as control loads, a driving source motor 606 for driving the pickup roller 238 associated with the cassette 240, the sheet absence sensor 243, and the feed sensor 247. The slave CPU 602 performs control until a printing material is conveyed to the feed path 266. The slave CPU 603 has, as control loads, a driving source motor 607 for driving the pickup roller 239 associated with the cassette 241, the sheet absence sensor 244, and the feed sensor 248. The slave CPU 603 performs control until a printing material is conveyed to the feed path 266. The slave CPU 604 has, as control loads, a driving source motor 608 for driving the pickup roller 254 associated with the manual paper feed unit 253, the sheet absence sensor 245, and the feed sensor 249. The slave CPU 604 performs control until a printing material is conveyed to the feed path 266. The slave CPU 605 has, as control loads, driving source motors 609, 610, and 611 for driving the feed roller pairs 235, 236, and 237 and the registration sensor 256. The slave CPU 605 controls these control loads to perform control until each of printing materials fed from the cassettes 240 and 241 and the manual paper feed unit 253 is conveyed to come into contact with the nip portion of the registration roller pair 255 and is temporarily stopped. In the embodiment, the sub-master CPU 601 is connected one-to-one to the slave CPUs 602, 603, 604, and 605 via the independent high-speed serial communication buses 612, 613, 614, and 615.

Figure 6:
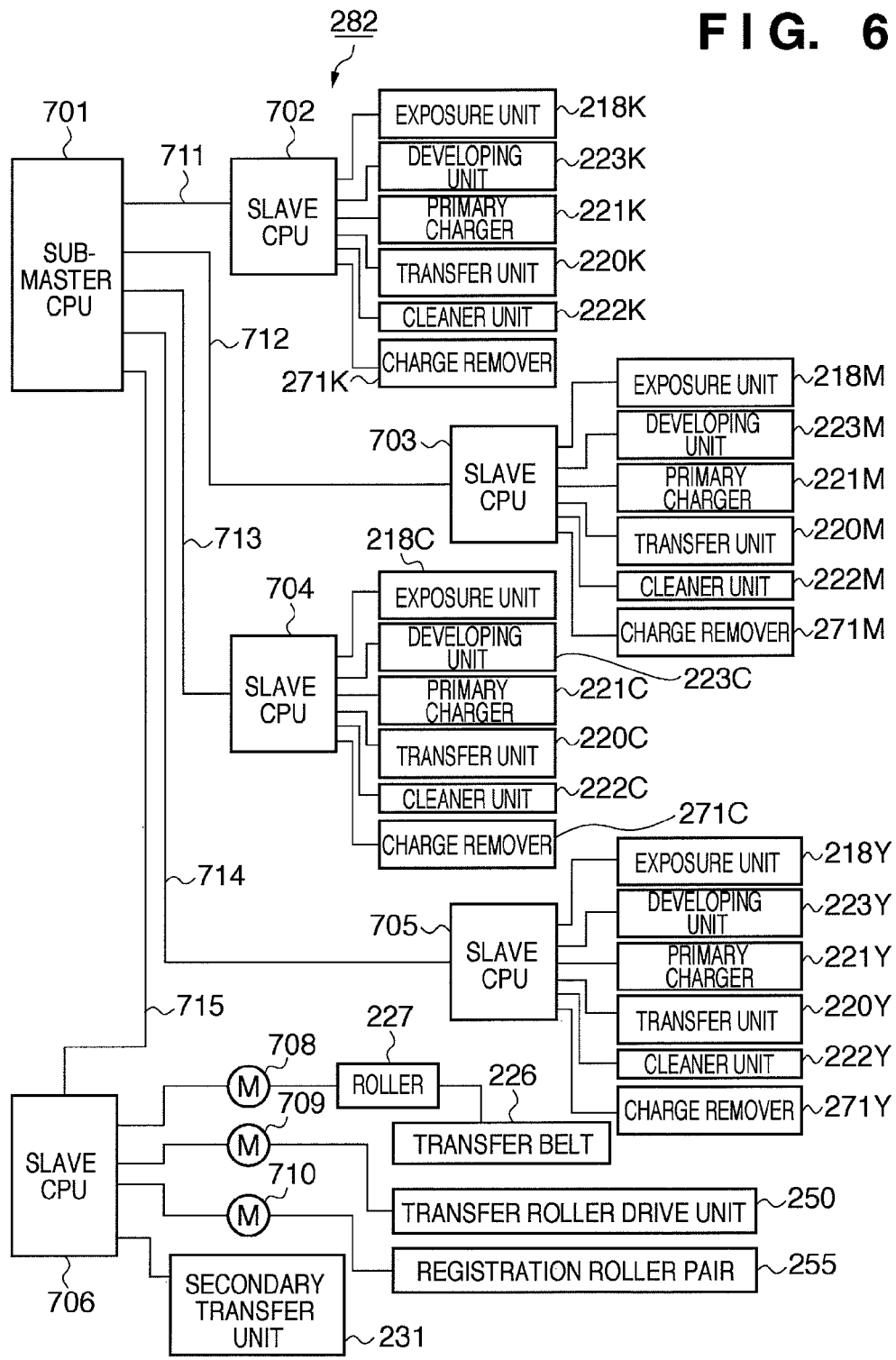
FIG. 6 is a view showing an example of the arrangement of an image forming module 282 according to the embodiment.

FIG. 6 shows an example of the arrangement of the image forming module 282 according to the embodiment. The image forming module 282 takes charge of image formation control (image formation function) until a full-color toner image formed by an electrophotographic process is transferred onto the transfer belt 226 and re-transferred onto a printing material conveyed by the convey module A 280. The image forming module 282 includes the sub-master CPU 701 to comprehensively perform image formation control and the slave CPUs 702, 703, 704, 705, and 706 to drive control loads. Each slave CPU is connected to control loads directly controlled by it.

The slave CPU 702 has, as control loads, an exposure unit 218K, the developing unit 223K, a primary charger 221K, a transfer unit 220K, a cleaner unit 222K, and a charge remover 271K. The slave CPU 702 performs control until a black toner image is transferred onto the transfer belt 226. The slave CPU 703 has, as control loads, an exposure unit 218M, the developing unit 223M, a primary charger 221M, a transfer unit 220M, a cleaner unit 222M, and a charge remover 271M. The slave CPU 703 performs control until a magenta toner image is transferred onto the transfer belt 226. The slave CPU 704 has, as control loads, an exposure unit 218C, the developing unit 223C, a primary charger 221C, a transfer unit 220C, a cleaner unit 222C, and a charge remover 271C. The slave CPU 704 performs control until a cyan toner image is transferred onto the transfer belt 226. The slave CPU 705 has, as control loads, an exposure unit 218Y, the developing unit 223Y, a primary charger 221Y, a transfer unit 220Y, a cleaner unit 222Y, and a charge remover 271Y. The slave CPU 705 performs control until a yellow toner image is transferred onto the transfer belt 226.

The slave CPU 706 has, as control loads, a motor 708 for the roller 227 to drive and rotate the transfer belt 226, a high-voltage signal output unit to drive the secondary transfer unit 231, and driving source motors 709 and 710 to drive the transfer roller drive unit 250 and the registration roller pair 255. The slave CPU 706 controls these control loads to perform control until multiple toner images of the four colors transferred on the transfer belt 226 are re-transferred onto a printing material by the secondary transfer unit 231. In the embodiment, the sub-master CPU 701 is connected one-to-one to the slave CPUs 702, 703, 704, 705, and 706 via the independent high-speed serial communication buses 711, 712, 713, 714, and 715.

Figure 7:
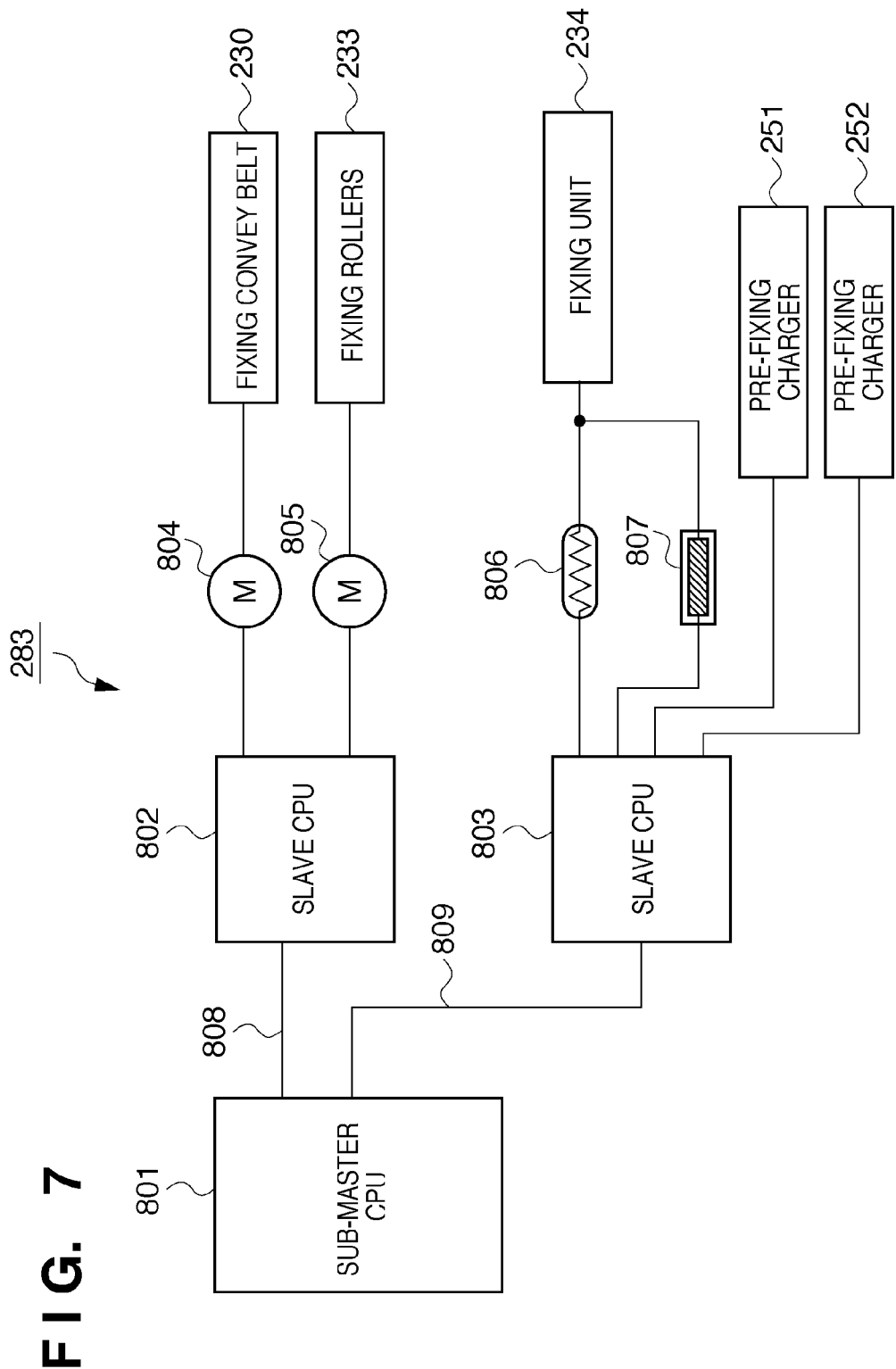
FIG. 7 is a view showing an example of the arrangement of a fixing module 283 according to the embodiment.

FIG. 7 shows an example of the arrangement of the fixing module 283 according to the embodiment. The fixing module 283 takes charge of fixing control (fixing function) until a printing material bearing a toner image transferred by the image forming module 282 is fed to the fixing unit 234 and the toner image is thermally fixed on the printing material. The fixing module 283 includes the sub-master CPU 801 to comprehensively perform fixing control and the slave CPUs 802 and 803 to drive control loads. Each slave CPU is connected to control loads directly controlled by it.

The slave CPU 802 has, as control loads, a driving source motor 804 for rotating the fixing convey belt 230 and a driving source motor 805 for rotating the fixing rollers 233. The slave CPU 802 performs control until a printing material is conveyed from the secondary transfer unit 231 to the conveying path after fixing. The slave CPU 803 has, as control loads, a heater 806 in the fixing unit 234, a temperature detection thermistor 807, and the pre-fixing chargers 251 and 252. The slave CPU 803 controls these control loads to perform fixing temperature control of the fixing unit 234 by optimally generating heat from the heater 806 while charging the fixing rollers 233 by the pre-fixing chargers 251 and 252 and feeding back a detection result from the temperature detection thermistor 807. In the embodiment, the sub-master CPU 801 is connected one-to-one to the slave CPUs 802 and 803 via the independent high-speed serial communication buses 808 and 809.

Figure 8:
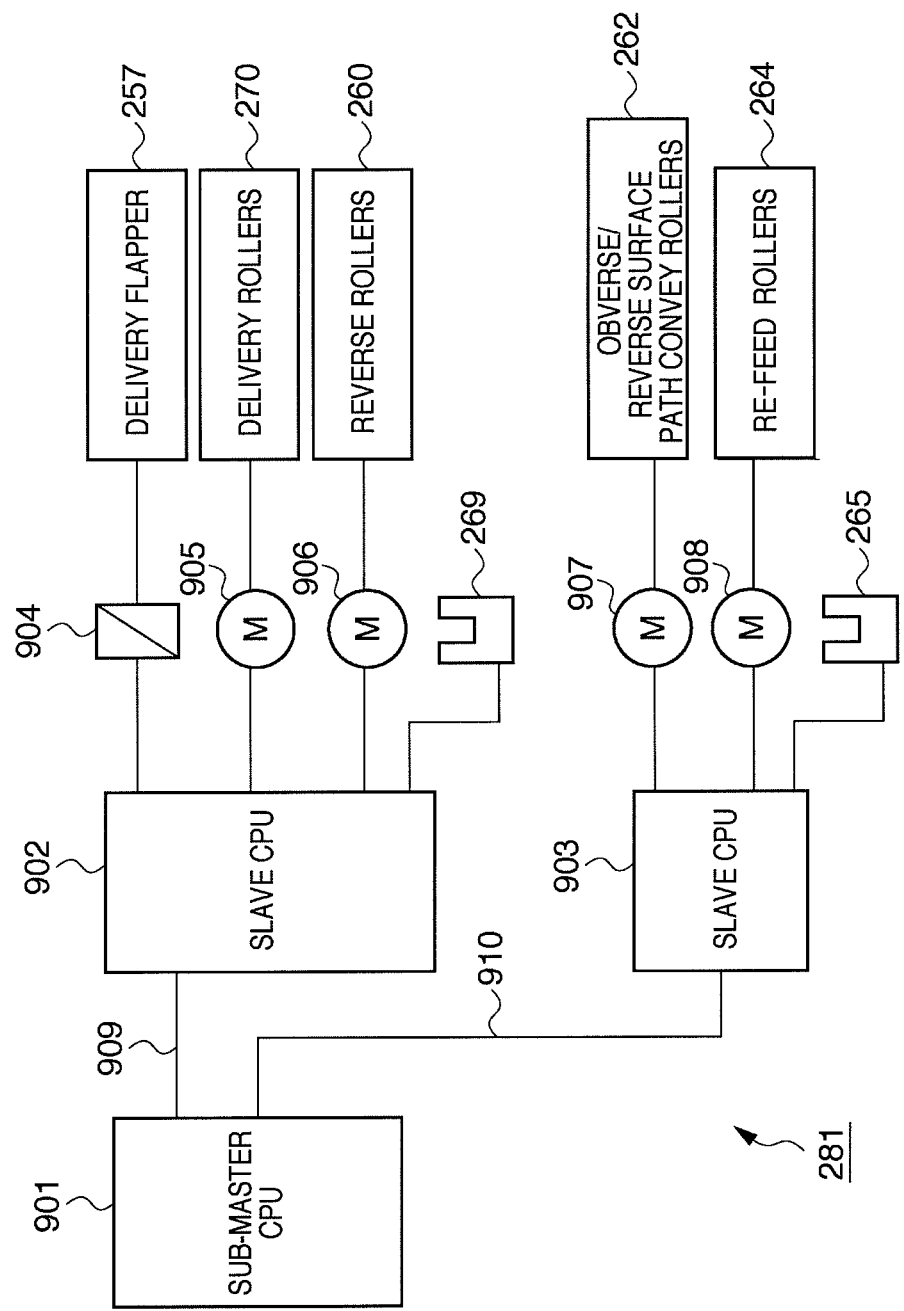
FIG. 8 is a view showing an example of the arrangement of a convey module B 281 according to the embodiment.

FIG. 8 shows an example of the arrangement of the convey module B 281 according to the embodiment. The convey module B 281 takes charge of delivery control (delivery function) until a printing material bearing an image fixed by the fixing module 283 is received and delivered outside the image forming unit 300, or reverse surface inversion control (inversion function) until the obverse and reverse surfaces of a printing material are inverted for reverse surface printing and the printing material is conveyed to the convey module A 280. The convey module B 281 includes the sub-master CPU 901 to comprehensively perform delivery control and reverse surface inversion control and the slave CPUs 902 and 903 to drive control loads. Each slave CPU is connected to control loads directly controlled by it.

The slave CPU 902 has, as control loads, a solenoid 904 for switching the delivery flapper 257, a driving source motor 905 for driving the delivery rollers 270, a driving source motor 906 for driving the reverse rollers 260, and the sensor 269. The slave CPU 902 controls these control loads to perform control until a printing material is delivered outside the apparatus from the conveying path after fixing or is conveyed to the obverse/reverse surface inversion path 261. The slave CPU 903 has, as control loads, a driving source motor 907 for driving the obverse/reverse surface path convey rollers 262, a driving source motor 908 for driving the re-feed rollers 264, and the re-feed sensor 265. The slave CPU 903 controls these control loads to perform control until a printing material having passed through the inversion path is conveyed to the feed path 266 again. In the embodiment, the sub-master CPU 901 is connected one-to-one to the slave CPUs 902 and 903 via the independent high-speed serial communication buses 909 and 910.

The embodiment achieves image formation control for a printing material by combining the autonomous operations of the foregoing four sub-modules. However, a practical image forming operation is divided into several patterns in accordance with combinations of selection of a feed tray/paper size, designation of one-sided/two-sided printing, designation of monochrome printing/color printing, and the like. When the operator makes settings in advance via the operation unit 10 and an external I/F 465, specific instructions are input. To perform an operation the operator wants based on the instructions, overall control is necessary to make the respective modules systematically operate. In the embodiment, the master CPU 1001 in the master module 284 comprehensively controls the sub-master CPUs 601, 701, 801, and 901. The rough sequence of overall control by the master CPU 1001 is done by exchanging commands between the master CPU 1001 and the sub-master CPUs 601, 701, 801, and 901 by communication via the low-speed network communication bus 1002. This sequence is also achieved by exchanging commands between the sub-master CPUs 601, 701, 801, and 901 and the slave CPUs 602, 603, 604, 605, 702, 703, 704, 705, 706, 802, 803, 902, and 903 by one-to-one communication via high-speed serial communication buses.

<Configuration Process>

Figure 10:
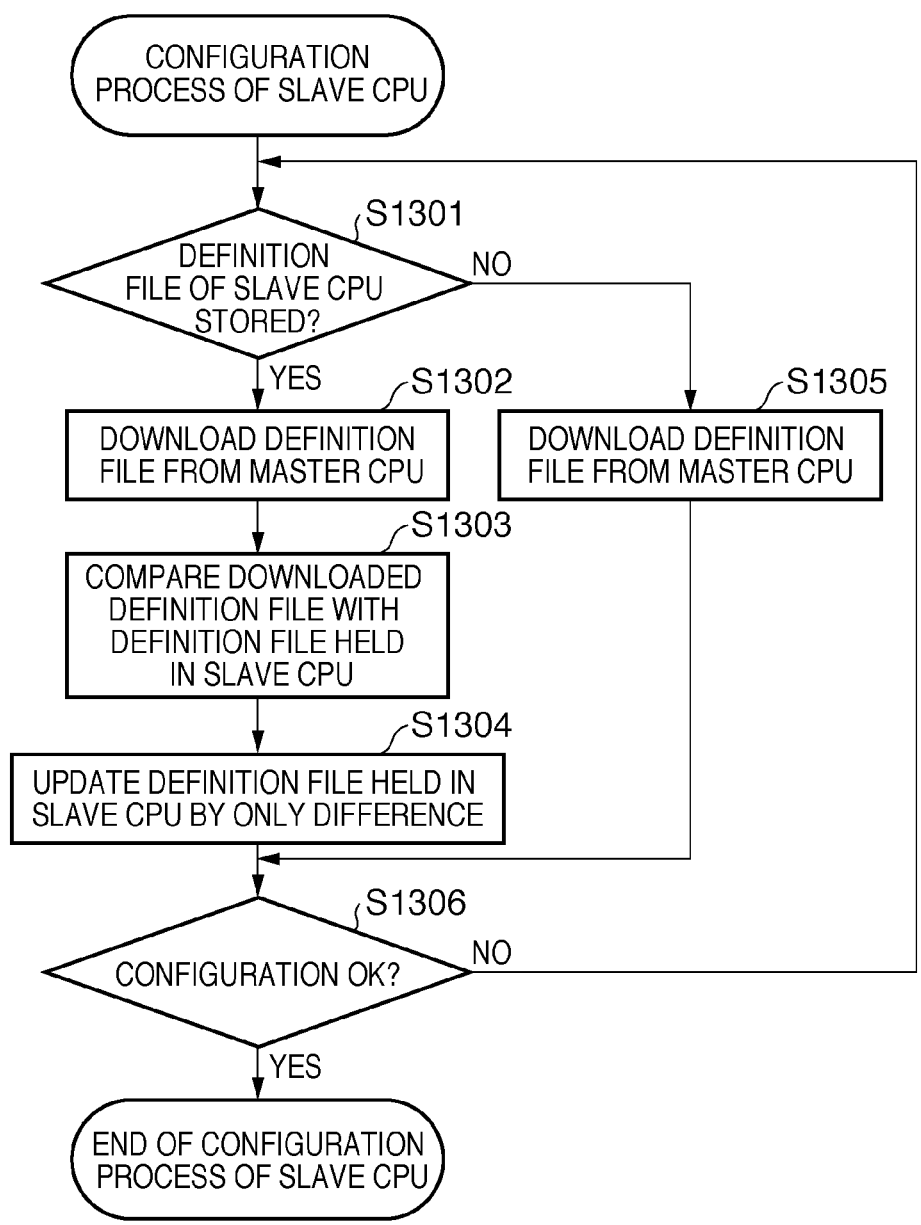
FIG. 10 is a flowchart showing the sequence of a configuration process executed by the slave CPU according to the embodiment.

A configuration process upon turning on the slave CPU serving as a lower layer control unit will be explained with reference to FIG. 10. The following process is common to the slave CPUs, so reference numerals are not explicitly described.

Upon power-on, the slave CPU determines in step S1301 whether a definition file has been stored in the EEPROM. If the slave CPU determines that no definition file has been stored, it advances to step S1305. If the slave CPU determines that a definition file has been stored, it advances to step S1302. The definition file determines the operating state of the slave CPU as a system. The definition file defines the operating frequency of the CPU, the number of motors controlled by the slave CPU, the numbers of sensors, solenoids, and clutches, and the like.

In step S1302, the slave CPU downloads a definition file that is held in the master CPU 1001 for the slave CPU. A definition file already held in the slave CPU (stored in the EEPROM upon power-on) will be called the first definition file. A definition file downloaded from the master CPU 1001 will be called the second definition file. In processes of step S1302 and subsequent steps, it is determined whether the first definition file is appropriate for the system, and the first definition file is updated for a shortage. Note that the downloaded second definition file is stored in an area of the EEPROM different from an area where the first definition file is stored.

In step S1303, the slave CPU compares the first and second definition files. In step S1304, if the first and second definition files are different from each other, the slave CPU updates the first definition file by only the difference, stores the updated first definition file again in the EEPROM, and then advances to S1306. In step S1304, if the first and second definition files are different from each other, the slave CPU may delete the first definition file and store the second definition file in the area where the first definition file was stored.

In step S1305, the slave CPU does not hold the first definition file and thus downloads the second definition file held in the master CPU 1001. The slave CPU stores the downloaded second definition file in the EEPROM and advances to step S1306.

In step S1306, the slave CPU determines whether the configuration process (process of setting contents defined by the definition file in the slave CPU) has been performed normally. If the configuration process has ended normally, the slave CPU ends the process; if NO, returns to step S1301 to repeat the configuration process.

All slave CPUs in the system executes this configuration process. After the end of the configuration process by each slave CPU, the system starts normally. However, when the operating frequency of the slave CPU is a multiple or fraction of that of another slave CPU or has the same period, the leading edges of the operation clocks of the slave CPUs match each other. As a result, the peak value of the frequency spectrum of the clock signal rises, increasing radiation noise. In the embodiment, to reduce the radiation noise, the operating frequencies of the respective slave CPUs are set different from each other so that the leading edges of the operation clock signals of the slave CPUs shift from each other.

<Operating Frequency Change Control>

Figure 11:
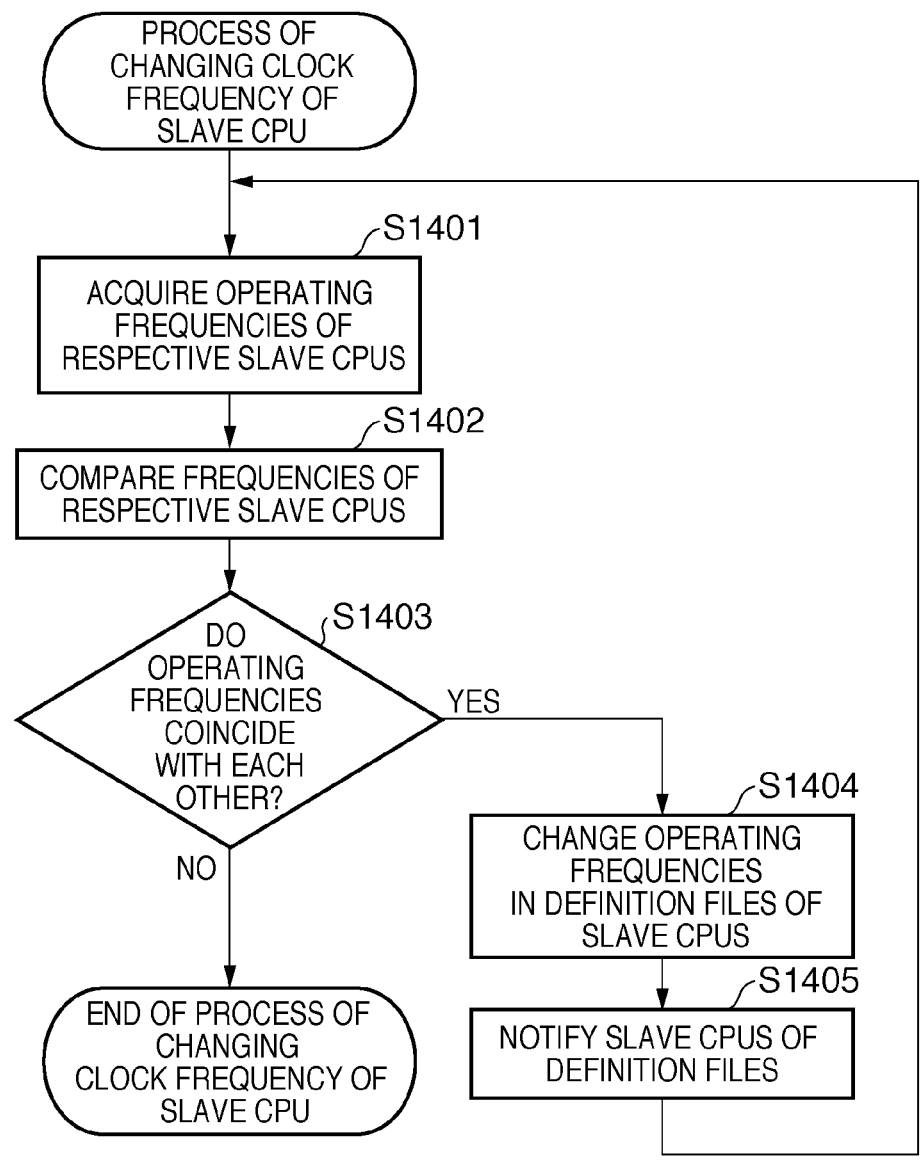
FIG. 11 is a flowchart showing a sequence to change the clock frequency of the slave CPU according to the embodiment.

Control to change the operating frequency of each slave CPU will be described below with reference to FIG. 11. The master CPU 1001 serving as the upper layer control unit comprehensively controls the following process. In the process to be described below, the master CPU 1001 functions as a determination unit, comparison unit, change unit, calculation unit, and acquisition unit.

In step S1401, the master CPU 1001 acquires the definition files of all slave CPUs from the slave CPUs via their sub-master CPUs, and holds them in the EEPROM. In step S1402, the master CPU 1001 compares operating frequencies defined in the definition files of all slave CPUs. In step S1403, the master CPU 1001 determines from the comparison result whether operating frequencies coincide with each other. If no operating frequencies coincide with each other, the master CPU 1001 ends the process of changing the operating frequency of the slave CPU. In step S1403, the master CPU 1001 may determine whether there is an operating frequency which is a multiple or fraction of another one, in addition to determining whether two or more slave CPUs have the same operating frequency.

If operating frequencies coincide with each other, the master CPU 1001 advances to step S1404 to change operating frequencies in the definition files of the slave CPUs except for one slave CPU so that they become different from each other. As the operating frequency change method, for example, an ID number is assigned to each slave CPU in priority order, and the operating frequency of a slave CPU having a small ID number (high priority level) is increased preferentially. This is merely an example of the method of changing the operating frequency, and the operating frequency of the slave CPU may be determined by another method. After determining the operating frequency of the slave CPU again by this method, the master CPU 1001 advances to step S1405.

In step S1405, the master CPU 1001 transmits, to the slave CPU, the definition file of the slave CPU that has been updated in step S1404. Upon receiving the updated definition file from the master CPU 1001, the slave CPU executes the configuration process based on the definition file received from the master CPU 1001, changing the operating frequency. After the end of the process in step S1405, the master CPU 1001 returns to step S1401 to execute the operating frequency change process until the operating frequencies of all slave CPUs become different from each other. In this description, the operating frequencies of all slave CPUs are set different from each other. Instead, the operating frequencies of all sub-master CPUs and all slave CPUs may be set different from each other. The operating frequencies of the master CPU, all sub-master CPUs, and all slave CPUs may be set different from each other.

<Modification>

Figure 12:
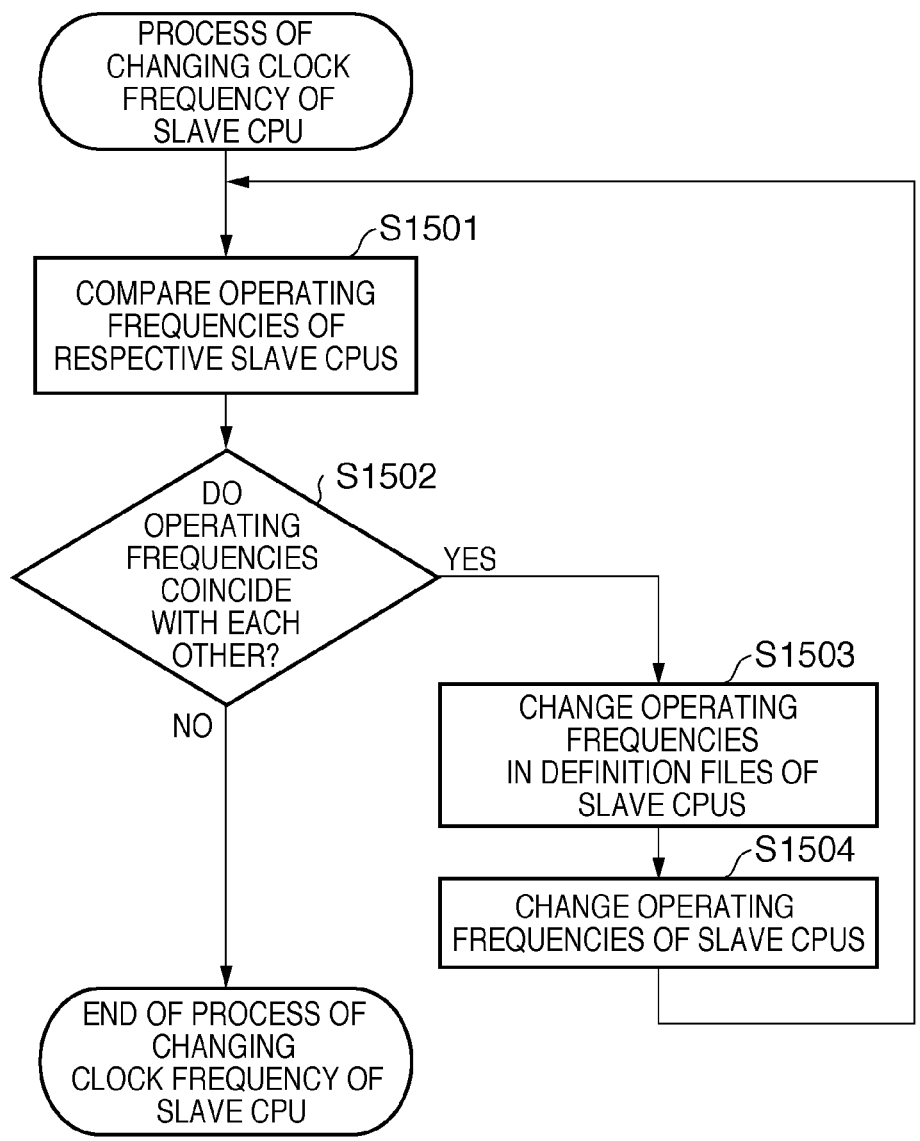
FIG. 12 is a flowchart showing another sequence to change the clock frequency of the slave CPU according to the embodiment.

Next, a modification to the operating frequency change control described with reference to FIG. 11 will be explained with reference to FIG. 12. In FIG. 11, the master CPU determines whether the operating frequencies of the slave CPUs coincide with each other. In FIG. 12, the slave CPU determines whether its operating frequency coincides with that of another slave CPU. The following process is common to the slave CPUs, so reference numerals are not explicitly described. In the process to be described below, each slave CPU functions as a determination unit, comparison unit, change unit, calculation unit, and acquisition unit.

In step S1501, the slave CPU compares its operating frequency with that of another slave CPU, stores the comparison result in a temporary area such as the RAM, and then advances to step S1502. Before performing the comparison, the slave CPU acquires the operating frequencies of the remaining slave CPUs from the slave CPUs. In step S1502, the slave CPU determines whether its operating frequency coincides with that of another slave CPU. If there is a coincident operating frequency, the slave CPU advances to step S1503; if NO, ends the process. In step S1501, the slave CPU may determine whether its operating frequency is a multiple or fraction of that of another slave CPU, in addition to determining whether its operating frequency coincides with that of another slave CPU.

In step S1503, the slave CPU changes the operating frequency item in the held definition file. As the operating frequency change method, for example, an ID number is assigned to each slave CPU in priority order, and the operating frequency of a slave CPU having a small ID number (high priority level) is increased preferentially. This is merely an example of the method of changing the operating frequency, and the operating frequency of the slave CPU may be determined again by another method.

In step S1504, the slave CPU changes its operating frequency based on the definition file containing the changed operating frequency item. The process then returns to step S1501. The operating frequency change process is executed until the operating frequencies of all slave CPUs become different from each other.

<Operating Frequency Determination Control>

Figure 13:
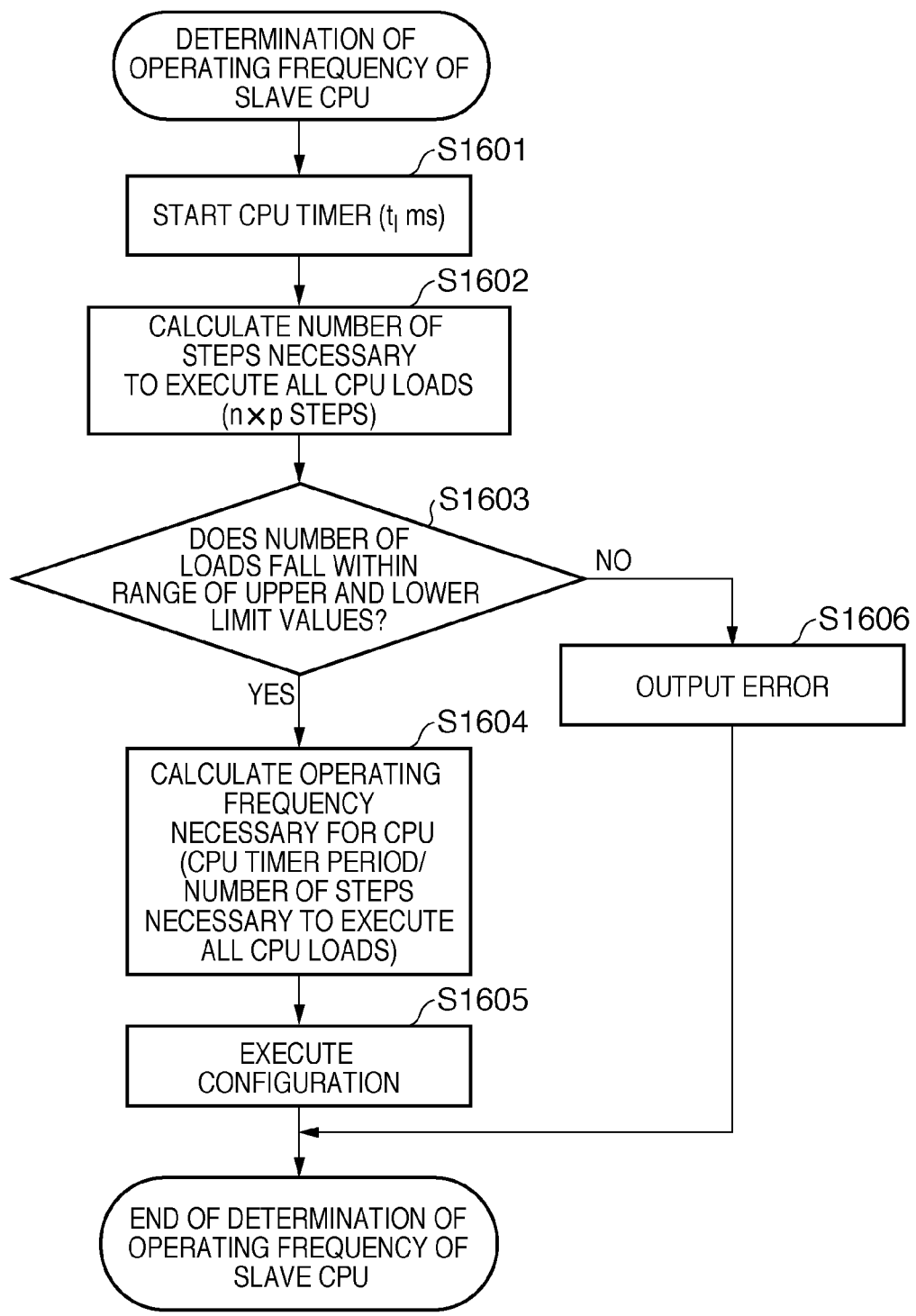
FIG. 13 is a flowchart showing a sequence to determine the operating frequency of the slave CPU according to the embodiment.

Control to determine the operating frequency of each slave CPU will be described with reference to FIG. 13. Although change of the operating frequency of the slave CPU has been described with reference to FIGS. 11 and 12, the operating frequency of the slave CPU is not arbitrary. There are the minimum operating frequency for making the control delay of the whole system fall within the allowable range, and the maximum operating frequency which is the maximum performance of the CPU itself. A slave CPU whose operating frequency has been changed according to the process of FIG. 11 or 12 checks whether its operating frequency falls within the range of the upper and lower limits of the slave CPU. The following process is common to the slave CPUs, so reference numerals are not explicitly described.

In step S1601, the slave CPU starts a timer that is one resource of the slave CPU. The timer generates interrupts at a predetermined interval $t_I$ corresponding to the time taken to execute a main program once by the slave CPU. The predetermined interval $t_I$ is necessary for cooperation between slave CPUs to attain a predetermined precision, and is set at the design stage. Since the controlled objects of the respective slave CPUs are different, the predetermined interval $t_I$ can be changed for each slave CPU. After the timer starts normally, the slave CPU advances to step S1602.

In step S1602, the slave CPU calculates the number of operation steps (number of operation clocks) necessary to control all target loads. For example, the slave CPU 602 has a motor 1ch and sensor 2ch as loads. Controlling the motor 1ch requires five steps (five clocks). For example, to control a stepping motor, the slave CPU reads out a pulse period corresponding to the target speed of the stepping motor from the RAM which is a resource of the slave CPU, and writes it in the register of the stepping motor driver. Executing this process by the slave CPU requires five operation clocks (five steps) supplied to the slave CPU. The stepping motor driver supplies pulses to the stepping motor in the pulse period set in the register, thereby rotating the stepping motor at a rotational speed corresponding to the pulse period. Also, controlling the sensor 2ch requires 15 steps (15 clocks). Hence, the total number of operation steps necessary to control all target loads of the slave CPU 602 is 20. The image forming apparatus 1000 may store, in advance in a storage unit (e.g., EEPROM or RAM), a table which defines the number of operation steps necessary to control each load. With the table, the slave CPU can easily calculate the number of operation steps necessary to control each load.

In step S1603, the slave CPU determines whether the number of loads of the slave CPU falls within the range of the upper and lower limit values of the number of steps that are defined in advance in the definition file. If the number of loads of the slave CPU falls outside the range of the upper and lower limit values of the number of steps, the slave CPU advances to step S1606 to output an error. If the number of loads of the slave CPU falls within the predetermined range (between the upper and lower limit values), the slave CPU advances to step S1604.

In step S1604, the slave CPU calculates a necessary operating frequency. The operating frequency is calculated using the timer period which has started in step S1601, and the number of steps calculated in step S1602. More specifically, the operating frequency is calculated by dividing the timer period by the number of steps. For example, when the predetermined interval $t_I$ is 200 μs and the number of steps is 20, the time of one step (period of one clock) suffices to be 10 μs and the time need not be shorter than 10 μs. As the time of one step (period of one clock) is shorter, the operating frequency becomes higher. At a higher operating frequency, the influence of radiation noise becomes more serious. From this, the minimum operating frequency of the slave CPU is set to a frequency corresponding to the clock period obtained by dividing the timer period by the number of steps. In the above-mentioned example, the operating frequency is set to 100 kHz in correspondence with the 10 μs clock period. Further, the slave CPU updates the operating frequency in the definition file to the calculated one.

In step S1605, the slave CPU executes the configuration process based on the definition file updated in step S1604.

In this sequence, the slave CPU itself determines its operating frequency. Alternatively, the master CPU or sub-master CPU which controls each slave CPU may determine the operating frequency of the slave CPU.

<Operating Frequency Change Method>

Figure 14:
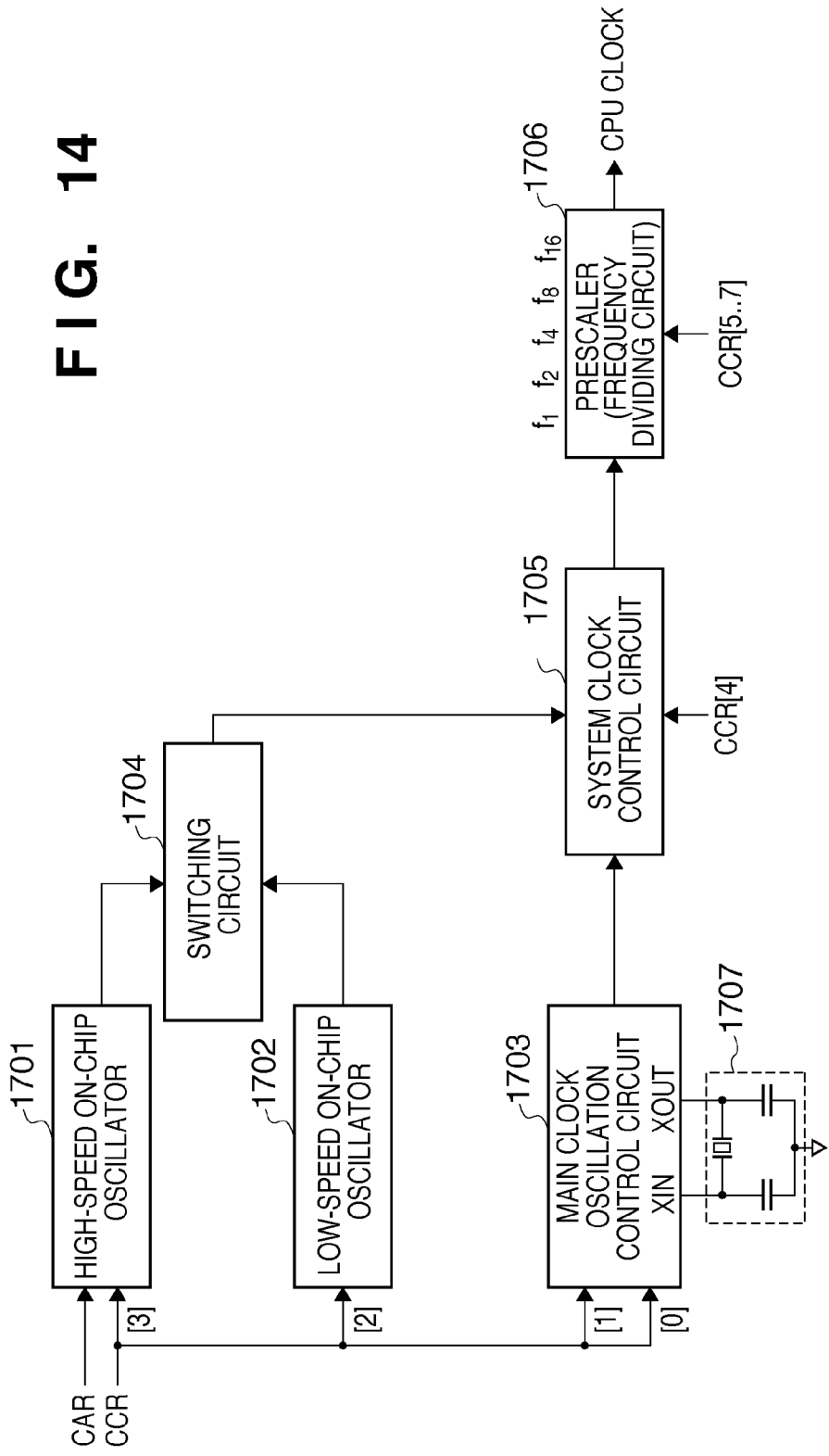
FIG. 14 is a block diagram showing a clock generation circuit arranged in the slave CPU according to the embodiment.

A method of changing the operating frequency of the slave CPU will be described with reference to FIG. 14. Three types of clocks are prepared as shown in FIG. 14, and a prescaler (frequency dividing circuit) 1706 is connected to the respective clock circuits. Thus, system clocks can be set by three× frequency division designable count. In general, the main clock is at a stop immediately after reset, and it is necessary to oscillate the main clock and switch the clock. The system clock is set in a clock control-related register.

The main clock is supplied from a main clock oscillation circuit and serves as a clock source for the CPU clock and peripheral function clock. For the main clock, an oscillator 1707 is connected between the XIN and XOUT terminals. This arrangement can input an externally generated clock to the XIN terminal to operate the main clock oscillation circuit. The main clock is at a stop immediately after reset and starts oscillating upon setting CCR[0] to "1" (to select the XIN and XOUT terminals) and CCR[1] to "0". After the oscillation of the main clock stabilizes, CCR[4] is set to "0" and the main clock serves as a CPU clock source.

The CPU clock can be output by oscillating an on-chip oscillator clock. For example, a high-speed on-chip oscillator 1701 and low-speed on-chip oscillator 1702 are mounted as on-chip oscillators. Generally, a clock generated by the low-speed on-chip oscillator 1702 serves as a clock source for the CPU clock, peripheral function clock, and the like. The oscillation of the low-speed on-chip oscillator can be stopped by setting CCR[2] to "0".

In contrast, a clock generated by the high-speed on-chip oscillator 1701 serves as a clock source for the CPU clock, peripheral function clock, and the like, similar to the low-speed on-chip oscillator clock. In general, the high-speed on-chip oscillator clock is at a stop immediately after reset. The oscillation frequency can be adjusted based on the CAR register setting.

A system clock control circuit 1705 can select the main clock or on-chip clock. The system clock output from the system clock control circuit 1705 serves as a clock source for the CPU clock and peripheral function clock. The prescaler 1706 divides the frequency of the system clock selectively output from the system clock control circuit 1705. The prescaler 1706 can divide the frequency of the system clock by, e.g., one, two, four, eight, or 16. An arbitrary frequency-divided system clock can be selected based on CCR[5], and the selected system clock is output as the CPU clock.

The clock generation circuit incorporated in the slave CPU is merely an example. Another clock generation circuit may be arranged to arbitrarily control the system clock.

As described above, the image forming apparatus according to the embodiment determines the operating frequency of a slave CPU in accordance with loads controlled by the slave CPU in the distributed control system, and changes the operating frequency of a slave CPU that is equal to the operating frequency of another slave CPU. That is, the image forming apparatus controls to prevent the coexistence of slave CPUs having the same operating frequency. The image forming apparatus can suppress an increase in cost by applying the distributed control system. In addition, the image forming apparatus can suppress increases in radiation noise and power consumption when the leading edges of operation clock signals match each other in a plurality of slave CPUs.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-105609 filed on Apr. 23, 2009, which is hereby incorporated by reference herein in its entirety.

What is claimed is:

1. An image forming apparatus comprising an upper layer control unit;
   first and second lower layer control units that are controlled by said upper layer control unit;
   first and second loads that are controlled by said first and second lower layer control units, respectively;
   a comparison unit that compares a first operating frequency of said first lower layer control unit with a second operating frequency of said second lower layer control unit; and
   a change unit that makes the first operating frequency differ from the second operating frequency, in a case where said comparison unit compares the first operating frequency with the second operating frequency and determines that the first operating frequency is the same as the second operating frequency.

2. The apparatus according to claim 1, wherein said change unit changes the first operating frequency or the second operating frequency based on each predetermined priority order of said first and second lower layer control units.

3. The apparatus according to claim 2, wherein
said upper layer control unit controls said change unit, acquires data indicating the first and second operating frequencies from said first and second lower layer control units, and transmits changed operating frequency information to said first or second lower layer control unit corresponding to the changed operating frequency.

4. The apparatus according to claim 1, further comprising:
a plurality of clock generation circuits that generate clock signals; and
a frequency dividing circuit that is connected to each of said plurality of clock generation circuits,
wherein said change unit changes the first operating frequency by changing settings of said plurality of clock generation circuits and said frequency dividing circuit.

5. An image forming apparatus comprising:
an upper layer control unit that controls the image forming apparatus which forms an image on a printing material;
a plurality of lower layer control units that are controlled by said upper layer control unit and control loads for performing image formation;
a comparison unit that compares operating frequencies of said plurality of lower layer control units; and
a change unit that changes an operating frequency of a second lower layer control unit that is equal to an operating frequency of a first lower layer control unit among said plurality of lower layer control units,
wherein said first lower layer control unit controls said change unit and comprises an acquisition unit that acquires the operating frequencies from said plurality of lower layer control units.

6. An image forming apparatus comprising:
an upper layer control unit that controls the image forming apparatus which forms an image on a printing material;
a plurality of lower layer control units that are controlled by said upper layer control unit and control loads for performing image formation, said plurality of lower layer control units including a first lower layer control unit and a second lower layer control unit; and
a change unit that changes an operating frequency of said second lower layer control unit in a case where the operating frequency of said second lower layer control unit is equal to an operating frequency of the first lower layer control unit.

7. The apparatus according to claim 6, wherein
said change unit determines the changed operating frequency of said second lower layer control unit based on a number of steps for controlling one of the loads by said first lower layer control unit.

* * * * *